Figure 1:
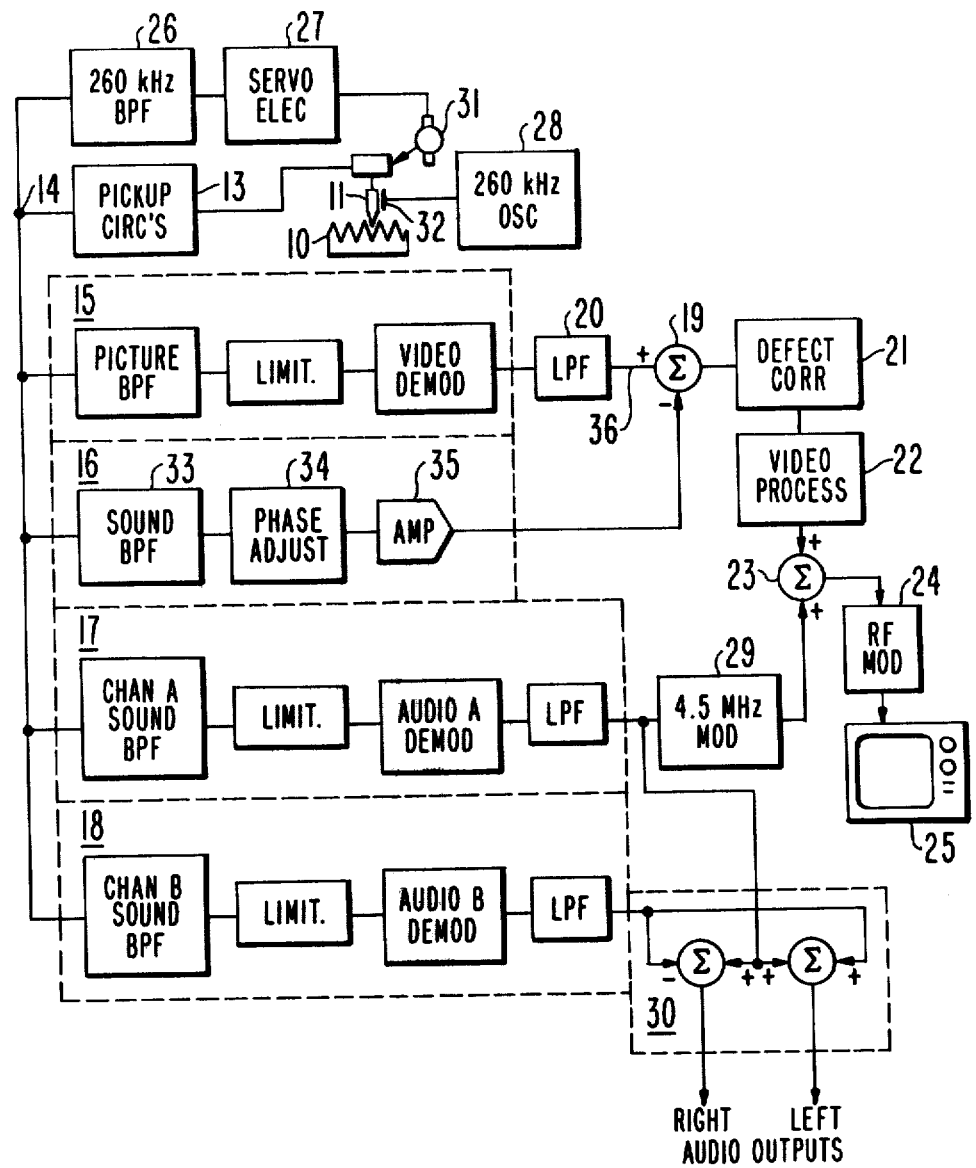

United States Patent [19]

Palmer

[11] 4,309,722
[45] Jan. 5, 1982

[54] VIDEO DISC PLAYER NOISE REDUCTION CIRCUIT

[75] Inventor: Richard C. Palmer, Blawenburg, N.J.

[73] Assignee: RCA Corporation, New York, N.Y.

[21] Appl. No.: 153,626

[22] Filed: May 27, 1980

[51] Int. Cl.³ .................................................. H04N 5/76
[52] U.S. Cl. .................................. 358/128.5; 360/19; 360/20
[58] Field of Search ...................... 358/8, 36, 167, 196, 358/198, 128.5, 127; 360/26, 33, 34, 19, 20, 29, 30; 369/90, 134, 174, 175; 455/303, 304, 305, 306

[56] References Cited

U.S. PATENT DOCUMENTS

| | | | |
|---|---|---|---|
| 2,073,458 | 3/1937 | Silent | 369/174 |
| 2,852,602 | 9/1958 | Foster | 455/305 X |
| 3,132,339 | 5/1964 | Boughnou | |
| 3,842,194 | 10/1974 | Clemens | |
| 3,879,748 | 4/1975 | de Boer | |
| 3,934,263 | 1/1976 | Palmer | |
| 3,984,867 | 10/1976 | Harnandez | |
| 3,988,531 | 10/1976 | Laub | |
| 4,044,379 | 8/1977 | Halter | |
| 4,051,533 | 9/1977 | Griffiths | 360/19 X |
| 4,150,395 | 4/1979 | Pritchard | |
| 4,166,251 | 8/1979 | Ishigaki et al. | 455/303 X |
| 4,166,251 | 8/1979 | Ishigaki et al. | |
| 4,167,749 | 9/1979 | Burrus | 358/8 |
| 4,208,673 | 6/1980 | Numakura | 358/8 |
| 4,237,485 | 12/1980 | Saito et al. | 455/305 X |

*Primary Examiner*—Bernard Konick
*Assistant Examiner*—Donald McElheny, Jr.
*Attorney, Agent, or Firm*—E. M. Whitacre; J. S. Tripoli; E. P. Herrmann

[57] ABSTRACT

In a video disc player intermodulation distortion can occur during signal recovery and is manifested as the modulated sound carrier appearing in the baseband video. To reduce such distortion, a portion of the signal recovered from the disc record is filtered to extract the modulated sound carrier. This signal is applied to a phase shifting circuit having a predetermined frequency response to condition the modulated sound carrier to have a phase characteristic substantially similar to the phase response of the modulated sound carrier appearing as distortion in the baseband video. The phase conditioned sound carrier is then amplitude adjusted and linearly subtracted from the baseband video signal.

8 Claims, 6 Drawing Figures

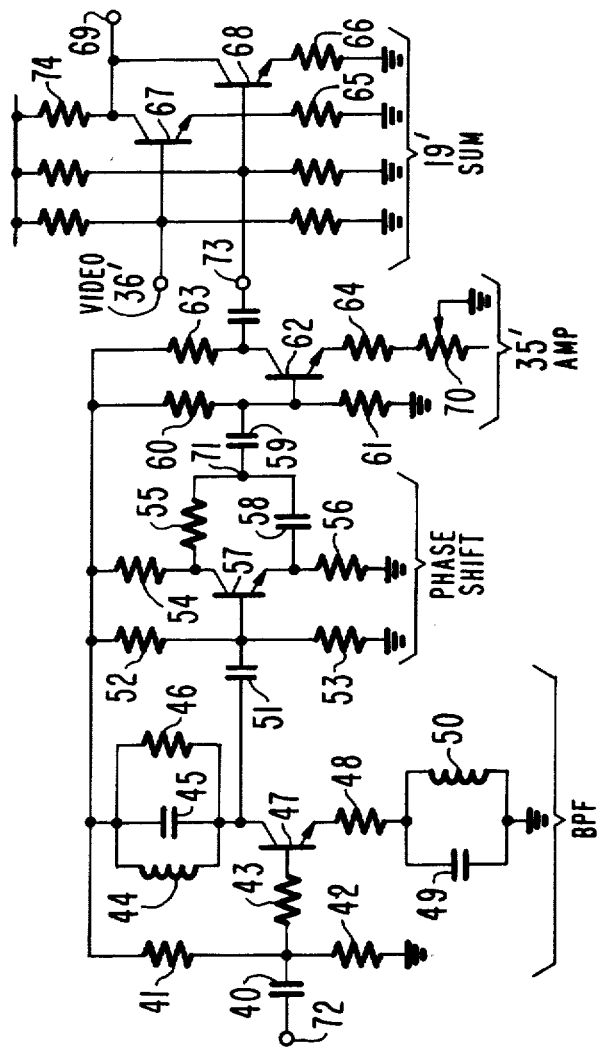
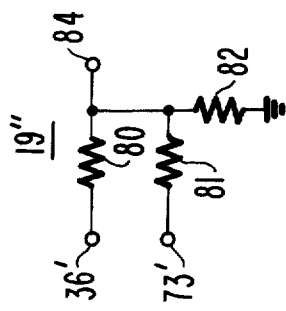
Fig. 4B.
Fig. 4A.

VIDEO DISC PLAYER NOISE REDUCTION CIRCUIT

This invention relates to video disc player circuitry and in particular to circuitry for reducing the intermodulation distortion of the video signal by the audio carrier.

Certain video disc systems utilize an arrangement wherein information is recorded on disc records by means of geometric variations contained in information tracks or spiral grooves. The bulk material of the disc or at least a layer of material proximate the surface of the disc is conductive with a thin dielectric layer coating the surface of the disc. A signal pickup stylus having a conductive electrode engages the disc record, forming a capacitance therebetween. Signal is recovered from the disc by translating the signal pickup stylus along the track or groove creating a temporally varying capacitance in accordance with the geometric variations in the groove. The temporally varying capacitance is made part of a resonant circuit and causes a modulation of the resonant frequency of this circuit. A fixed frequency oscillatory signal having a frequency near the nominal frequency of the circuit is applied across the resonant circuit, and the amplitude of the oscillatory signal is modulated in accordance with the geometric variations present in the information track. The oscillatory signal is detected to generate a time varying signal corresponding to the recorded information. See U.S. Pat. No. 3,842,194 issued Oct. 5, 1974 to J. K. Clemens and assigned to RCA Corporation.

Various signal formats for incorporating color video and accompanying audio information contemporaneously in the same information track have been used. One such format comprises a signal wherein color video information is applied to frequency modulate a video carrier signal and the audio is superimposed on this signal by causing it to modulate the duty cycle of each cycle of the FM signal. Another format comprises the linear sum of several FM signals. In this instance audio signals (in the case of stereo) are caused to frequency modulate low frequency sound carriers over a low frequency deviation range (illustratively, 716±50 KHz and 905±50 MHz). A composite color video signal (including luminance and chrominance signals) is caused to frequency modulate a high frequency picture carrier over a high frequency deviation range (illustratively 5±1 MHz). The peak-to-peak amplitude of each sound modulator output signal is held at a level which is small relative to the peak-to-peak amplitude level of the video modulator output signal, e.g., 1:10. The respective modulated carriers are combined in a linear adder to form the composite signal for recording on the disc. The composite signal waveform is that of picture carrier waves with successive cycles swinging about an average value that varies as the sum of the sound carriers. Reference may be made to U.S. Pat. No. 4,044,379 issued to J. B. Halter Aug. 23, 1977 and entitled, "Method and Apparatus for Electromechanical Recording of Short Wavelength Modulation In a Metal Master", for a description of this superposition approach to modulation.

Recording the composite signal is effected by depressing or removing conductive disc material along the information track such that the geometrical profile along the track corresponds to the time varying amplitude of the signal. Thus the record of a hard limited FM signal might appear as a sequence of slots or depressions whose width and spatial rate of occurrence are in the same ratio as the electrical signals' half-period and temporal frequency. On the other hand, where multiple FM signals are linearly combined for recording, as in the foregoing second exemplar, the higher frequency carrier rides on the lower frequency carrier components so that information is contained in the amplitude as well as the phase of the composite signal. This information may be translated into the record media by varying the depth of the profile cut into the information track.

In order to place an acceptable amount of information, in terms of playing time, on a disc record, the information density is necessarily very high. Thus the geometric variations are concomitantly very closely spaced, i.e., in the order of one micrometer. Detecting the corresponding capacitance from a single FM signal cycle requires that the pickup electrode be of similar dimensions. To this end a composite pickup stylus may be utilized, comprising a hard dielectric support member (such as diamond, for example) one face of which has a thin film of conductive material applied thereto for forming the actual sensing electrode. The dielectric support member is configured to engage and track the information track as well as to support the electrode. The electrode, during information recovery, is located at the trailing face of the tracking dielectric member.

The aforementioned stylus structure is asymmetric with regard to the dielectric and electrode, i.e., the dielectric (diamond) adjacent the electrode and preceding the electrode in the information track has a different dielectric constant than the dielectric (air) on the opposite side of the electrode. It is believed that the asymmetric form of the stylus assembly leads to an intermodulation distortion in the recovered signal.

Ideally, only the bottommost portion of the electrode per se should "see" or effect a capacitance with the geometric track variation directly thereunder. In such case only the geometric variation immediately adjacent the electrode contributes to the instantaneous recovered signal. In reality, however, the stylus dielectric couples a larger area of the information track ahead of the electrode, as compared to the coupling through the air dielectric following the electrode. The areas, as well as the permittivity, of the air and diamond dielectrics being different, the capacitance coupled to the electrode thereby results in a net capacitance being coupled from the track geometry by the diamond support. The area of the base of the diamond adjacent to the track extends over a number of cycles of the video information. Thus the diamond support tends to integrate a contribution of signal capacitance ahead of the electrode and apply it to the electrode effecting a forward skewing of the signal recovered. The recovered signal thus contains the modulated sound and video carrier sensed instantaneously by the area of the stylus electrode adjacent to the track, and a signal component coupled to the electrode through the dielectric electrode support.

The effect of the latter result is an undesirable intermodulation distortion manifested by the modulated sound carriers appearing in the video signal. Upon demodulation of the video signal to baseband, a portion of the modulated sound carriers remain in the baseband video signal, having substantially the same absolute frequency as the sound carriers but having incurred a frequency sensitive phase shift.

The present invention is designed to reduce the undesired sound carrier occurring in the baseband video signal by generating a signal complementary to the undesired distortion and applying the complementary signal in a manner which effects a cancellation of the distortion.

In accordance with the present invention a portion of the recovered signal from the signal pickup circuitry is filtered to extract the modulated sound carriers. This signal is applied to a phase shifting circuit having a predetermined frequency response to condition the modulated sound carrier to have a phase characteristic substantially identical to the phase response of the modulated sound carrier appearing in the baseband video. The phase conditioned sound carrier is then amplitude adjusted and linearly subtracted from the baseband video signal.

In the drawings:

FIG. 1 is a block diagram of a portion of video disc player circuitry embodying the present invention.

Figure 2:
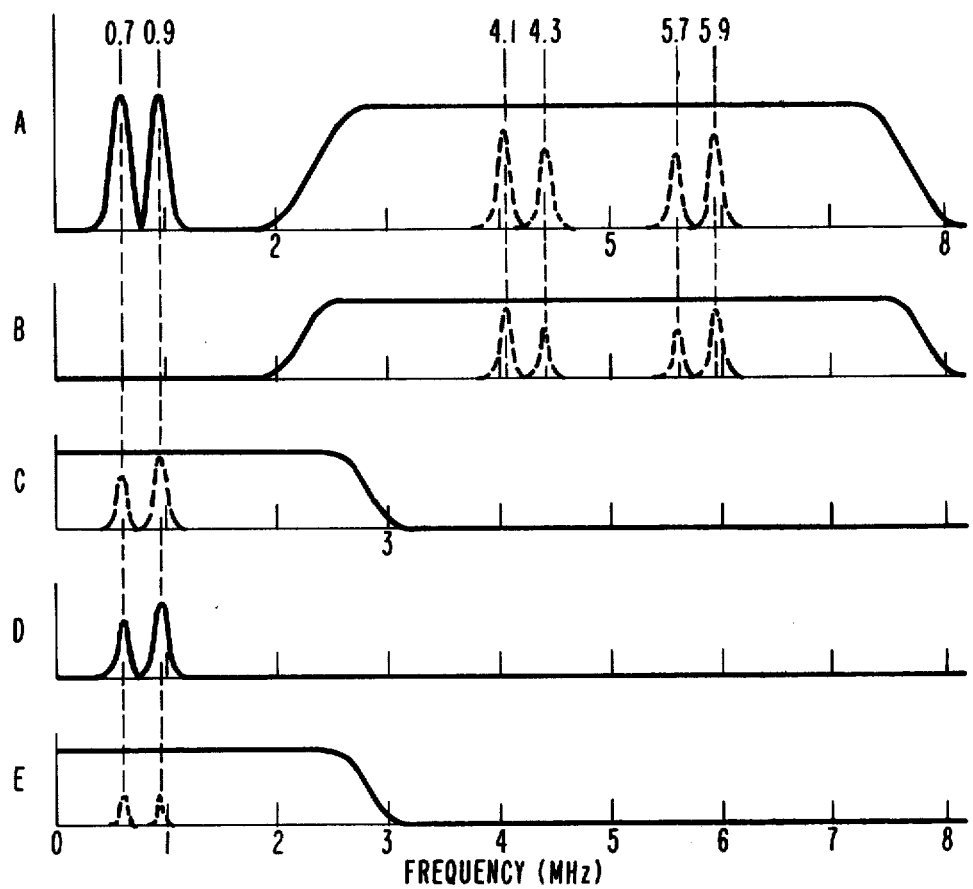
Figure 3:
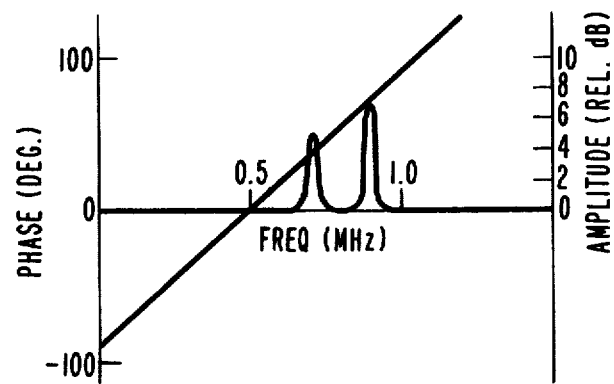
Figure 5:
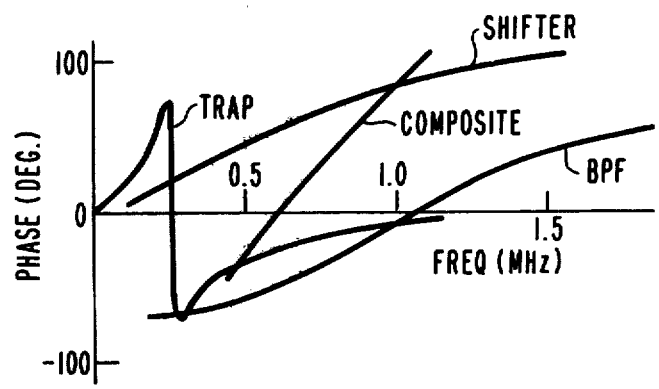

FIG. 2, including A-E, is a graph of the spectral content of the recovered signal at various points in the FIG. 1 circuitry;

FIG. 3 is a graphic representation of the frequency, phase and amplitude characteristics versus frequency of the distortion signal for a particular video disc player circuit;

FIG. 4, including A-B, is a schematic diagram of one embodiment of circuitry for generating a distortion cancellation signal;

FIG. 5 is a graphic representation of the phase responses of the FIG. 4 circuit elements.

Referring to FIG. 1, a disc record 10 is engaged by a signal pickup stylus 11, which in cooperation with the signal pickup circuits 13 produces an electrical manifestation of the recorded information contained on the disc record when relative motion is provided between the disc and the signal pickup stylus. When the stylus is of an unsymmetrical construction the recovered signal, available at the output terminal 14 of the signal pickup circuitry, contains an undesirable intermodulation distortion due to the interaction of the stylus and disc.

The recovered signal at terminal 14, typically in FM format, is separated into its video and audio components by circuitry 15 and circuits 17 and 18 respectively, and reduced to baseband or demodulated signals. The baseband video is applied to low pass filter 20 to limit bandwidth and thereby reduce undesired random electrical noise. This signal is applied to circuitry 21 which substitutes segments of defective or erroneous signal with acceptable signal delayed from a previous similar sequence of information. Circuitry 22, among other functions, upconverts the chroma subcarrier for compatible interplay with a typical consumer TV receiver 25.

Circuitry 17 (channel A) and similar circuitry 18 (channel B) separate out the stereo sound carriers from the recovered signal at terminal 14, demodulate the carrier to produce baseband audio and low pass filter the baseband audio signals to limit the attendant electrical noise. On monophonic discs only the channel A carrier is present and the channel B demodulator is squelched. When a stereo disc is played, the channel B demodulator produces a difference signal (left minus right), which is matrixed in circuitry 30 with the sum (left plus right) signal from channel A to produce the left and right outputs for driving a stereo speaker system. The channel A audio signal is applied to circuit 29 to modulate a TV sound carrier at 4.5 MHz for subsequent use in recovering audio from the TV receiver circuitry.

The video signals from circuitry 22 and the modulated sound carrier from modulator 29 are applied to linear summing circuit 23 which linearly combines the processed audio and video signals and applies this composite signal to rf modulator 24. Modulator 24 converts the combined audio and video signals to the TV signal format which would typically be broadcast for TV reception, and this signal is applied to the antenna terminal of receiver 25.

The player circuitry also includes a servo system for establishing the position of the pickup stylus 11. A position sensitive capacitor 32 injects a 260 KHz frequency from oscillator 28 to the recovered signal stream, the strength of the injected signal being inversely proportional to the relative distance of the stylus with respect to an electrode of the position sensitive capacitor which is constrained to a fixed location on the pickup stylus translation carriage. The 260 KHz signal is separated from the recovered signal by the band-pass filter 26, and applied to the servo electronics 27 which generates a control signal proportional to the strength of the recovered 260 KHz signal. The control signal energizes motive means 31 which tends to maintain the stylus in a nominally desired position.

Circuitry 16 and 19 are added to the player circuitry to ameliorate the aforementioned intermodulation distortion. The operation of this circuitry is more lucidly explained with reference to the spectral graphs of FIG. 2. FIG. 2A illustratively represents the spectral content of the signal recovered from the disc record as it appears at terminal 14. The two spectral bands occurring at 0.716 and 0.905 MHz represent the channel A and channel B audio carriers while the large spectral band encompassing 2–8 MHz represents the bandwidth of the composite video signal centered about the video carrier of 5 MHz. The video spectrum, i.e., 2–8 MHz, is not in fact a continuum but rather a series of spectral bands because of the FM nature of the signal, however, for purposes of the present discussion, considering the band to be a continuum is not of significant consequence. In one particular system the video center frequency deviates within the range of 3.9 to 6.9 MHz with the relevant concomitant sidebands occurring in the 2 to 9.5 MHz spectrum. For the instant that the video center frequency resides at 5 MHz (as shown in FIG. 2A), the intermodulation distortion is manifested by the sound signal occurring as video sidebands (illustrated as phantom sidebands) displaced 0.716 and 0.905 MHz above and below the 5 MHz frequency. These sidebands, of course, deviate with respect to their frequency location within the video spectrum in accordance with the deviation of the video center frequency.

FIGS. 2B and 2C illustrate the signal spectral content after passage through the video band-pass filter and video demodulator respectively of the circuitry 15. FIG. 2C spectrally represents baseband video and indicates that the intermodulation distortion is translated into the baseband video occurring in substantially the same spectral bands as the modulated sound carriers.

In order to reduce the intermodulation distortion, circuitry 16 generates a signal which is substantially similar to the distortion as manifested in the baseband video signal. The generated signal (illustrated spectrally in FIG. 2D) is linearly subtracted from the baseband video signal by circuit element 19. The spectral content of the resultant baseband video signal occurring at the output of circuit 19 is illustrated in FIG. 2E with the distortion components significantly reduced.

The distortion components, which ultimately appear in the video baseband signal, at the terminal 36 undergo significant signal processing by virtue of circuitry 15. This processing imposes a frequency sensitive phase and amplitude change in the manifested distortion signal with respect to the sound signals present at terminal 14. The phase response, representative of one particular system, is illustrated in FIG. 3 as a linearly increasing delay at the rate of 90° per 0.5 MHz. The attendant amplitude response is a 6 db per octave amplitude increase in the relevant spectral band. In order that the signal generated by circuit 16 effectively cancels the video baseband distortion, it must emulate the frequency, amplitude and phase components of the distortion signal. The same skirt of the filter response curve results in a 6 db per octave amplitude difference (approximately 2 db) between the sound carriers. Thus the filter 33 provides a cancellation signal with the desired frequency and amplitude characteristics.

The signal from band-pass filter 33 is applied to a phase adjusting circuit 34 which imparts the requisite frequency sensitive phase shift to the cancellation signal taking into account the phase shift inherently imparted by the band-pass filter 33. The resultant signal is applied to amplifier 35 which linearly increases or decreases the amplitude of the cancellation signal to the value and polarity which most effectively eliminates the distortion signal.

It is noted that the sound band-pass filter 33 imparts significantly more phase shift than the video band-pass filter within circuit 15. To partially compensate for this difference the low pass filter 20 is interposed in the video circuit ahead of the summing circuit 19. It is also noted that the amplifier 35 may be made adaptive, i.e., the gain may be made variable and controlled by a feedback signal derived from the residual intermodulation distortion remaining in the video baseband signal after passage through the summing circuit 19.

FIG. 4 illustrates a particular embodiment of the circuit elements in circuits 16 and 19. In the FIG. 4 circuit, however, the amplifier 35' is an inverting amplifier which permits direct subtraction of the cancellation signal from the baseband video by means of a resistive combiner. FIG. 5 shows the phase shift attendant the separate circuit blocks in the FIG. 4 circuit.

The FIG. 4 circuit includes a single tuned bandpass filter to pass the sound carriers, a trap to eliminate the 260 KHz servo frequency tone and a phase shifting network. The trap is necessary for the reason that the selectivity of the bandpass filter is made relatively poor so that its phase response in the region including 0.715 to 0.905 MHz is relatively well defined. The trap comprises the emitter circuit of transistor 47 and is tuned to be parallel resonant at 260 KHz. The gain of the amplifier including transistor 47 and its collector load comprising the parallel circuit of inductor 44, capacitor 45 and resistor 46 is a function of the ratio of the load impedance connected in the collector circuit to the impedance connected in the emitter circuit of the transistor amplifier. At 260 KHz, the resonant frequency of the trap, the impedance of the emitter circuit approaches a very large value, reducing the gain of the amplifier to a value precluding the passage of that signal. The parallel circuit including capacitor 49 and inductor 50 in the emitter circuit is required to have a high Q in order that the loss of circuit gain does not extend into the frequency bands of the sound carriers. (Note that for player systems which do not superimpose a frequency tone onto the signal for servo purposes, the trap is not necessary and the parallel resonant circuit in the emitter circuit of transistor 47 can be eliminated, simplifying the circuit.) The phase response of the trap with respect to the amplifier input terminal 72 is shown in FIG. 5 and it is noted that it contributes to the phase response of signals in the frequency band of interest.

For signal frequencies, beyond the trap resonance, the transistor 47 with its parallel tuned collector load, functions as a simple band-pass amplifier or filter as is well-known in the art. The parallel tuned collector load, i.e., inductor 44, capacitor 45, and resistor 46, is tuned for resonance at approximately 1 MHz such that both sound carriers occur within a relatively well-defined band-pass transfer or response function. As such, both the amplitude response and the phase response can be predicted with reasonable accuracy. The Q factor of the collector circuit is intentionally made low, e.g., 1-2, to further insure the predictability of circuit response.

The phase response attendant the band-pass amplifier conforms to a well-known characteristic which is derivable from the "universal resonance curve" (Terman, *Radio Engineers Handbook*, McGraw Hill, N.Y., 1943, p. 137) and is illustrated in FIG. 5. The phase response is a relatively smooth curve wherein the absolute phase angle at a particular frequency within the frequency range of interest is capable of adjustment, i.e., increased or decreased, by increasing or decreasing the frequency at which the collector load is at resonance and thereby the frequency at which the curve intersects the zero phase line.

Signal from the band-pass amplifier or filter is coupled via capacitor 51 to the phase shifter circuit including resistors 54, 55 and 56, transistor 57 and capacitor 58. The transistor 57 having resistors 56 and 54 serially connected respectively in its emitter and collector circuits forms an amplifier having complementary output terminals at its collector and emitter terminals, i.e., the signals at the collector and emitter terminals have a 180° phase difference for signal applied to the input or base electrode. A serially connected resistor 55 and capacitor 58 are connected between the amplifier complementary output terminals and an output terminal 71 is taken at the interconnection of resistor 55 and capacitor 58. For the case of the complementary signals at the transistor 57 collector and emitter electrodes having equal amplitudes, the signal amplitude at the output terminal 71 is equal to the amplitude of one of the equal amplitude signals appearing at either the emitter or collector electrodes over a broad frequency range. In other words, the circuit has a substantially constant amplitude response in the frequency range of interest. The phase response, $\theta$, of the circuit can be shown to be:

$$\theta = 2 \arctan(\omega RC) \tag{1}$$

where $\omega$ is the signal frequency in radians, R is the resistance value of resistor 55 and C is the capacitance value of capacitor 58. This phase response is illustrated in FIG. 5. Equation (1) is a first order approximation as the phase angle $\theta$ is affected by the impedances exhibited at the collector and emitter electrodes of transistor 57. Second order effects are accounted for in selecting the RC value to produce the desired amount of phase shift at a given frequency.

The trap circuit, band-pass amplifier and phase shifter effectively impart their respective phase responses to the signal passed therein in serial fashion. Therefore, the separate phase functions are additive. The composite phase formation is shown in FIG. 5, which composite function closely approximates the phase function illustrated in FIG. 3 representative of the phase response of the distortion signal imparted by the video processing circuit 15.

The signal at terminal 71 closely approximates, in form, the intermodulation distortion signal in the baseband video. To subtract the signals the cancellation signal is made negative (complementary) and added to the baseband video. A signal is "made negative" in the foregoing context by applying broadband inversion or 180° phase shift without additional phase shift with respect to frequency. This function is performed by the common emitter amplifier comprising transistor 62, collector resistor 63 and emitter resistors 64 and 70 shown in FIG. 4A. The collector signal voltage of a common emitter amplifier has an inherent 180° phase difference with respect to its input or base terminal. The resistor 70 in the emitter circuit is made variable for adjusting the ultimate signal amplitude of the transistor 62 collector electrode.

Component values for the FIG. 4 circuit to produce the phase response illustrated in FIG. 5 are listed in Table I.

TABLE I

| Resistor | Resistance (Ohms) |
|---|---|
| 41 | 10,000 |
| 42 | 2,200 |
| 43 | 56 |
| 46 | 1,000 |
| 48 | 270 |
| 52 | 10,000 |
| 53 | 5,600 |
| 54 | 1,000 |
| 55 | 2,200 |
| 56 | 1,000 |
| 60 | 100,000 |
| 61 | 13,000 |
| 63 | 1,000 |
| 64 | 100 |
| 70 | 500 |

| Capacitor | Capacitance |
|---|---|
| 40 | 0.01 μf |
| 45 | 180 pf |
| 49 | 2,200 pf |
| 51 | 0.01 μf |
| 58 | 100 pf |
| 59 | 0.01 μf |

| Inductor values. | |
|---|---|
| Inductor 44 | 150 μh |
| Inductor 50 | 150 μh |
| Transistor 47 | 2N 4124 |
| Transistor 57 | 2N 4124 |
| Transistor 62 | 2N 4124 |

The summing circuit 19' in FIG. 4A linearly adds the baseband video signal available from the video demodulator and applied at terminal 36' with the cancellation signal applied at terminal 73. The transistor 67 generates an AC collector current $I_{67}$ proportional to the baseband video potential, $V_{36}$, applied to its base electrode, i.e., $I_{67} = K_1 V_{36}$, where $K_1$ is a constant. Transistor 68 generates an AC collector current $I_{68}$ proportional to the cancellation signal potential, $V_{73}$, applied to its base electrode, i.e., $I_{68} = K_2 V_{73}$, where $K_2$ is a constant. The currents $I_{67}$ and $I_{68}$ are caused to flow through load resistor 74 and develop an AC potential given by $$V_{69} = R(I_{67} + I_{68}) = R(K_1 V_{36} + K_2 V_{73}) \quad (2)$$

where R is the resistance value of load resistor 74 and $V_{69}$ is the AC potential appearing at terminal 69. The right hand side of equation (2) indicates that the AC signal developed across resistor 74 is proportional to the linear sum of the applied signals and if $K_1 = K_2 = 1/R$ then $V_{69} = V_{36} + V_{73}$. The respective emitter resistors 65 and 66 are included to limit the respective currents that flow in transistors 67 and 68.

FIG. 4B is illustrative of a further summing circuit 19" for linearly adding the compensation signal available at terminal 73 and the video baseband signal. Baseband video is applied to terminal 36', compensation signal is applied to terminal 73' and the corrected video is available at terminal 84. If the output impedance of amplifier 35' is small compared to the resistance, R81, of resistor 81, and the source impedance at terminal 36' of the video signal is small compared to the resistance, R80, of resistor 80, it can be shown that the signal, V84, available at terminal 84 is given by:

$$V84 = K_1 V73' + K_2 V36' \quad (3)$$

where $K_1 = R80\ R82/(R80\ R81 + R80\ R82 + R81\ R82)$ and $K_2 = R81\ R82/(R80\ R81 + R80\ R82 + R81\ R82)$. Equation (3) indicates that the output signal V84 is the linear sum of the correction signal V73' and the baseband video signal V36'.

What is claimed is:

1. A video disc player for recovering prerecorded signals from a disc record, wherein the prerecorded signals are formed from the composite sum of a first signal modulating a first carrier and a second signal modulating a second carrier, said player comprising:

signal recovery means cooperating with the disc record for generating an electrical manifestation of the prerecorded signals;

first circuit means connected to receive said electrical manifestation of the prerecorded signals for selectively demodulating said first carrier;

second circuit means connected to receive said electrical manifestation of the prerecorded signals for selectively extracting the second modulated carrier from the composite sum of signals;

third circuit means connected to receive the second modulated carrier from the second circuit means for conditioning the phase characteristic of the second modulated carrier to simulate the phase characteristics of frequency components of the demodulated signal in the same spectral band as the second modulated carrier;

fourth means for linearly subtracting the phase conditioned second modulated carrier from the demodulated signal.

2. A video disc player for recovering prerecorded signals from a disc record, wherein the prerecorded signals are formed from the composite sum of a first signal modulating a first carrier and a second signal modulating a second carrier, said player comprising:

signal recovery means cooperating with the disc record for generating an electrical manifestation of the prerecorded signals;

first circuit means connected to receive said electrical manifestation of the prerecorded signals for selectively demodulating said first carrier, wherein the demodulated signal is subject to inclusion of an undesirable intermodulation distortion manifested as the modulated carrier of the second signal;

second circuit means connected to receive said electrical manifestations of the prerecorded signals for selectively extracting the second modulated carrier from the composite sum of signals and generating a signal therefrom complementary to the manifested intermodulation distortion; and means for linearly summing the first demodulated signal containing the intermodulation distortion and the complementary signal, thereby reducing the manifested distortion in the first demodulated signal.

3. The video disc player as set forth in claim 2 wherein the electrical manifestation of the prerecorded signals is an FM signal and the second circuit means comprises:

a band-pass filter connected to the signal pickup means to receive the FM signal and designed to pass the frequency components of the second modulated carrier and substantially attenuate the first modulated carrier;

means, connected to receive signals from the band-pass filter, for conditioning the phase angle of the second modulated carrier to coincide with the phase angle of the manifested distortion plus 180 degrees; and means for conditioning the amplitude of the phase altered signal to coincide with the amplitude of the manifested distortion.

4. The video disc player as set forth in claim 2 wherein the second circuit means comprises:

a band-pass filter having input and output terminals respectively, the input terminal being connected for receiving the electrical manifestation of the prerecorded signals, and the band-pass filter substantially attenuating all signals not within a predetermined frequency range of the second modulated carrier;

phase shifting circuitry having an input terminal connected to the band-pass filter output terminal for providing a phase shift to the second modulated carrier, and having an output terminal, the provided phase shift supplementing the phase shift inherently introduced by the band-pass filter so that the total phase angle of the second modulated carrier coincides substantially with the phase angle of the manifested distortion present in the first demodulated signal; and an inverting amplifier having an input terminal connected to the output terminal of the phase shifting circuitry, said amplifier contributing 180° of phase angle to the second modulated carrier and conditioning the amplitude of the second modulated carrier to a desired amplitude.

5. In a video disc player of the type having an asymmetric signal pickup stylus which has a dielectric member asymmetrically supporting a conductive signal pickup electrode, said player including pickup circuits cooperating with the signal pickup electrode for recovering prerecorded information from a disc record, circuitry for extracting baseband video signals from the recovered information, and circuitry for recovering baseband audio signals from modulated sound carrier components of the recovered information; said player being subject to sound carrier intermodulation distortion in the baseband video resulting from the interaction of the asymmetric signal pickup stylus with the recorded disc, the improvement comprising:

frequency selective circuitry responsive to the recovered signal from the pickup circuits for passing the modulated sound carrier substantially to the exclusion of all other signals;

frequency sensitive circuitry having a predetermined phase response for conditioning said modulated sound carrier to manifest a phase characteristic substantially similar to the sound carrier intermodulation distortion in the baseband video;

means for conditioning the amplitude of the phase conditioned modulated sound carrier; and means for linearly subtracting the conditioned modulated sound carrier from the baseband video signal and thereby to substantially cancel the intermodulation distortion therein.

6. The video disc player set forth in claim 5 wherein the frequency selective circuitry comprises:

a transistor having first and second electrodes, a principal conduction path therebetween, and a control electrode, the potential difference between the control electrode and first electrode controlling the principal conduction path;

means for applying the recovered signal to the control electrode; and a parallel resonance, resistor-capacitor-inductor load means, resonant near the sound carrier frequency, connected to the second electrode of the transistor at which point the modulated audio signal is available.

7. The video disc player set forth in claim 6 further including a tuned circuit connected between said first electrode and a point of fixed potential, said tuned circuit comprising:

a further resistor connected in series with a parallel tuned capacitor-inductor circuit resonant at a preselected frequency.

8. The video disc signal set forth in claim 5 or 6 wherein the frequency sensitive circuitry having a predetermined phase response comprises:

amplifier means having an input terminal for applying the modulated sound carrier, and having first and second output terminals, the signal phase difference between the first and second output terminals being essentially 180°; and the signal phase difference between the input and one of said first and second output terminals being essentially 0°; and a series connected resistor-reactance combination connected between the first and second output terminals of the amplifier means, an output signal being available at an interconnection of the resistor-reactance combination, the ratio of the resistance value to the reactance value of the resistor-reactance combination being selected in accordance with the frequency of the modulated sound carrier.

* * * * *